United States Patent [19]

Gernelle

[11] 4,349,285

[45] Sep. 14, 1982

[54] PRINTER HAVING ACOUSTIC HEAD LOCATING SYSTEM

[75] Inventor: François Gernelle, Le Chesnay, France

[73] Assignee: Compagnie Internationale pour l'Informatique CII Honeywell Bull, Paris, France

[21] Appl. No.: 161,148

[22] Filed: Jun. 19, 1980

[30] Foreign Application Priority Data

Jun. 19, 1979 [FR] France .................. 79 15626

[51] Int. Cl.³ .................. B41J 25/28; B41J 19/30
[52] U.S. Cl. .................. 400/320; 400/322; 400/328
[58] Field of Search .................. 400/320, 322, 328

[56] References Cited

U.S. PATENT DOCUMENTS

| 3,898,555 | 8/1975 | Tellerman | 324/208 |
| 3,950,685 | 4/1976 | Kramer | 400/328 X |
| 4,044,881 | 8/1977 | Chai et al. | 400/320 X |
| 4,146,922 | 3/1979 | Brown et al. | 400/320 X |
| 4,151,447 | 4/1979 | von der Heide et al. | 400/320 X |
| 4,208,142 | 6/1980 | Chu | 400/320 |

Primary Examiner—Paul T. Sewell
Attorney, Agent, or Firm—Lowe, King, Price & Becker

[57] ABSTRACT

The location of a dot printer print head driven by a linear motor on a movable carriage is detected with a system including an ultrasonic acoustic transmitter on a carriage for the head and a receiver on a frame of the printer.

9 Claims, 10 Drawing Figures

PRINTER HAVING ACOUSTIC HEAD LOCATING SYSTEM

TECHNICAL FIELD

The present invention relates to a rectilinear drive system for a dot type print head and, more particularly, to an apparatus for determining the print head location across a sheet and for controlling the print head location as it is being translated across the sheet.

BACKGROUND ART

Various types of printers have been developed for printing data contained in or treated by a computer. The printers apply characters to paper or other types of data recording carriers in response to signals from the computer. The printers include systems for guiding the paper and controlling the motion of the print head across the sheet. The print systems are frequently distinguished as mechanical printers and electrostatic or xerographic printers.

This type of printer usually includes means for determining the location of the print head to permit an exact automatic adjustment of the head at a point where it is desired to print a character. Printers are known in which potentiometric systems detect printer head location. Sensors of the potentiometric systems are connected to a position servo-controlling module which controls a motor for driving the printing head. However, such systems do not always prove to be sufficiently accurate and are incapable of relatively high speed servo-control. This is particularly disadvantageous in high speed dot printers in which different characters are formed by relatively high speed striking of a set of points which together define each character.

An object of the present invention is to provide a new and improved system for detecting print head location very accurately and easily without being very cumbersome.

DISCLOSURE OF THE INVENTION

According to the invention, print head location is detected with an accurate, ultrasonic, acoustic transmitter receiver system of simple construction. In this ultrasonic, acoustic system a transducer constituting the ultrasonic, acoustic transmitter is preferably fixed on the print head and an ultrasonic, acoustic transducer forming the receiver is fixed on one side, e.g., on the left hand side, of a frame for the printer. The transmitter is disposed on the print head carriage, being aligned with the receiver so as to move parallel to a rectilinear trajectory of the carriage and being at the same distance, equal to the height of the receiver, above the trajectory.

According to the invention, the ultrasonic, acoustic transmitter receiver system comprises a device for detecting the number of periods of a continuous acoustic wave transmitted between the transmitter and the receiver to determine the location of the printer to a resolution of one character length. The phase of the wave reaching the receiver is compared to that of the wave launched from the transmitter and coded to define the print head position to a resolution of one dot column within one character.

The frequency of a wave derived from the transmitter is controlled by memory means for first and second signals for deriving a difference signal. A digital/analogue converter responds to the difference signal to derive a frequency control signal. A voltage controlled oscillator responsive to the frequency control signal derives an excitation wave for the transmitter.

The above and still further objects, features and advantages of the present invention will become apparent upon consideration of the following detailed description of one specific embodiment thereof, especially when taken in conjunction with the accompanying drawings.

BEST MODE FOR CARRYING OUT THE INVENTION

Figure 1:
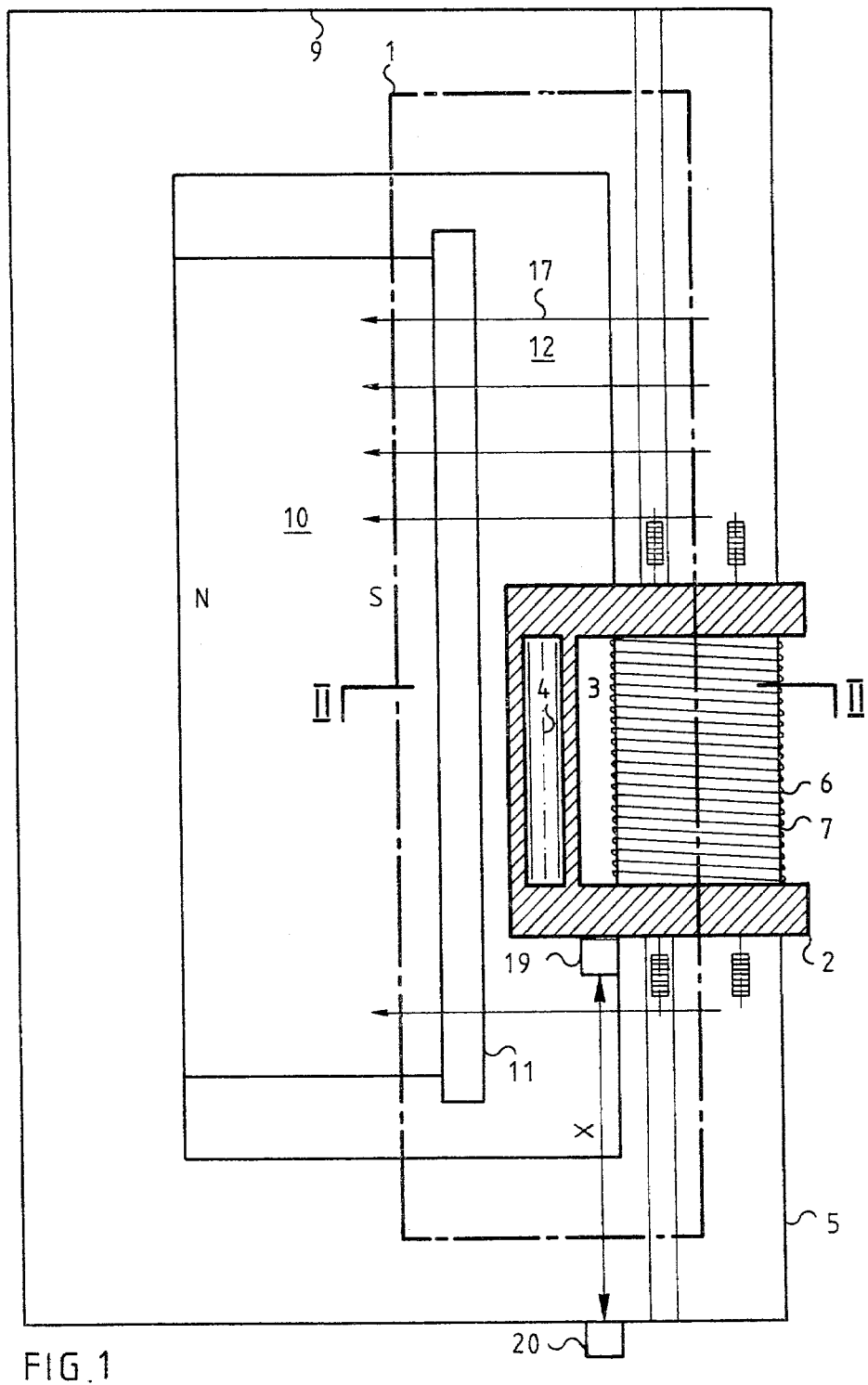
FIG. 1 is a partial schematic top view of one embodiment of a printer according to the invention, showing basically the printing device and its drive system.
Figure 2:
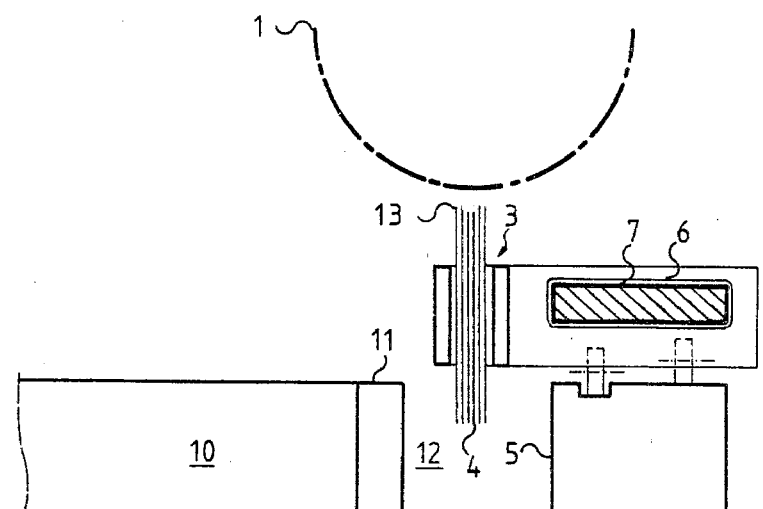
FIG. 2 is a schematic cross section of the device of FIG. 1, taken along the lines II—II of FIG. 1.

In FIGS. 1 and 2 are schematically shown the parts of the printer which are important for understanding the invention. The printer, basically of the dot type, comprises a cylinder 1 indicated by dot and dash lines. Carriage 2 is translated rectilinearly in front of cylinder 1. Carriage 2 carries print head 3 which includes several, typically seven, side by side print hammers 4. Carriage 2 is translated on a rectilinear guide rail 5 parallel to cylinder 1. On cylinder 1 is arranged a recording carrier, such as a sheet of paper, which is struck by the hammers of the print head 3.

Carriage 2 is displaced by a DC linear motor having an armature formed by a winding 6 which is wound on a support member 7. In a preferred embodiment, support member 7 is a duralumin rod forming the body of carriage 2. Carriage 2 is guided across guide rail 5 with the aid of an appropriate bearing system (not shown), for example, ball bearings. For this purpose, guide rail 5 is formed by a horizontal metal bar having a square or rectangular section, rectilinear groove in which two of the bearing members on one side of the carriage run; two other bearing members on a second side of the carriage move laterally with a slight off-set in height on the bar or in a second groove. The linear motor induction system includes a magnetic circuit formed by a closed, high magnetic permeability yoke 9, shaped as a rectangular ring. One longitudinal arm of the rectangular ring is formed by the guide rail 5. Yoke 9 encloses a permanent magnet NS 10 having a south (S) pole face abutting against one face of pole piece 11, and having a second face spaced from rail 5 by air gap 12. The north (N) pole face of magnet 10 abuts against and is fixed to the other longitudinal arm of yoke 9, see FIG. 1.

Figure 3:
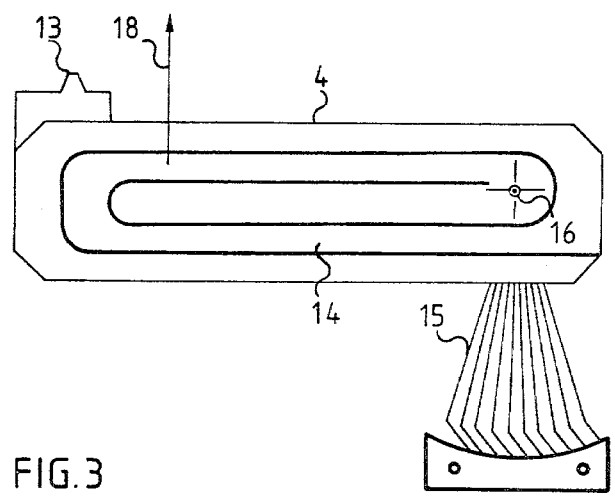
FIG. 3 is a more detailed view of a print member used in the device of FIGS. 1 and 2.

As is seen in FIGS. 1 and 2, print head 3 includes print hammers 4 which are constituted by flat plates. The flat plates have parallel longitudinal axes with immediately adjacent plates having almost abutting faces. Each plate has a pointed end 13 proximate cylinder 1, which end forms the actual dot-striking member. Since these print hammers can be of a known type, for example, as in U.S. Pat. No. 3,971,311, they are shown schematically in FIG. 3. Each print hammer 4 is basically formed by one or more spirals 14 cut from an elongated flat metal plate provided with a pointed protruding part 13 which prints a dot of the character to be represented. Each spiral 14 is connected to a small metal support tongue 15 forming a return spring. Each of tongues 15 is integral with a foot which supplies the hammer with an appropriate excitation current via the tongue. Each hammer is pivotable about horizontal axis 16. According to a preferred embodiment, seven hammers are arranged vertically on the print head (see FIG. 2) and positioned partly or completely in the air gap 12 of the linear motor.

In operation, carriage 2 is driven at a constant speed along guide rail 5 by the described DC linear motor. Each of print hammers 4 is separately activated with adequate control excitation to strike a selected character in the form of a set of dots.

Displacement of carriage 2 is obtained by supplying a control signal to the linear motor. The control signal is an appropriate operating current supplied to armature winding 6, located in air gap 12 of a magnetic field having lines of flux 17 (FIG. 1) extending from guide rail 5 to pole piece 11. The conbined action of the operating current which is circulating in winding 6 and of the magnetic field flux lines 17 creates a force for driving carriage 2 either to the right or left along its guide rail 5 depending on the direction of current flow in winding 6. Because air gap 12 extends over the greater part of the length of rail 5, corresponding to the desired length of print on cylinder 1 of the printer, carriage 2 can be driven between opposite side of yoke 9. Control of the linear motor is effected by a standard amplifier system having symmetrical output. The amplifier is connected to a system for servo-controlling the motor, as described infra. By way of example, the motor operates at a speed of one meter per second.

To control print hammers 4, of the type disclosed in the cited patent, it is necessary for the hammers to be placed in a uniform magnetic field which acts perpendicularly to the longitudinal axes thereof so that the action of the excitation current supplied to the flat conducting spirals of the hammers is combined with a permanent magnetic field which is perpendicular to the flat spiral. The current and magnetic field are combined to drive hammers 4 upward, as indicated by arrow 18. Hammers 4 pivot about axis 16 thereof. To pivot hammers 4, the invention uses the permanent field of the linear motor as a magnetic field by arranging the longitudinal axes of the flat hammers perpendicular to lines of flux 17. The current for controlling print hammers 4 is preferably produced by an amplifier with two simultaneously blocked or saturated transistors to produce the desired current as a function of a control signal.

It is to be understood that the print head can be miniaturized by integrating it with the linear motor carrying the print hammers in order to move the hammers completely into the air gap of the linear motor without reducing performance.

The system for detecting the print head location, as well as the systems for servo-control of the speed and position of this print head to provide correct, accurate and reliable operation of the printer, is described next.

In the print head location detection system according to the invention, an ultrasonic transmitter receiver system is used. Thus, as shown in FIGS. 1 and 2, an ultrasonic, acoustic transmitter 19 is placed on one face of translatable print head 3 and a fixed ultrasonic, acoustic receiver 20 is mounted on one side of yoke 9 of the printer. Transmitter 19 is disposed on yoke 9 so as to be aligned with receiver 20 and to move parallel to the guide rail 5. Transmitter 19 is at the same distance as receiver 20 from rail 5 but at a variable distance x from the receiver, whereby as head 3 traverses rail 5, the propagation time of ultrasonic, acoustic energy between the transmitter and receiver is directly proportional to x.

Figure 4:
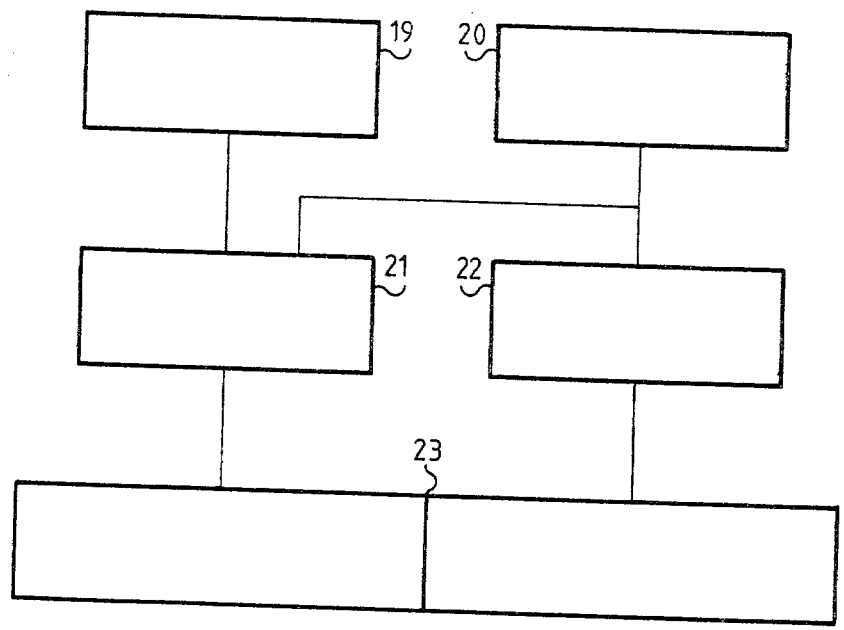
FIG. 4 is a block diagram of a print head location detection system according to the invention.

In FIG. 4 is shown the block diagram of the print head location detection system according to the invention. The principle of location detection involves comparing the phase of the transmitted, continuous wave ultrasonic, acoustic signal with that of the signal received by the receiver. The phase difference is measured by counting the passages through zero of the phase difference and the number of wavelengths $\lambda$ of the continuous acoustic wave between the transmitter and the receiver; $\lambda$ is preferably equal to the length of a character in the direction of movement of head 3 across the sheet. In one embodiment, wherein the character length is 2.5 mm, $\lambda = 2.5$ mm, a result achieved with an acoustic wave frequency of 137 kHz. The effect of this is that each time the phase difference between transmitter 19 and receiver 20 passes through zero, there is a determination of the start of a character. Conventional phase detectors have sufficient resolution to detect distance of 1/64th of a character. According to the system of FIG. 4, phase displacements within the distance of one character, i.e., phase angles within 360 degrees, are detected in phase displacement measuring device 21, responsive to transmitter 19 and receiver 20. To determine the character position of head 3 across the sheet, i.e., the number of characters across the sheet which head 3 is above, the pulse type outputs of receiver 20, one for each received cycle, are supplied to position counter 22 and the position count in device 22 is thus made from the wave received. The outputs of counters 21 and 22 are respectively supplied to fine and coarse segments of binary register 23 having a suitable digital display.

Figure 5:
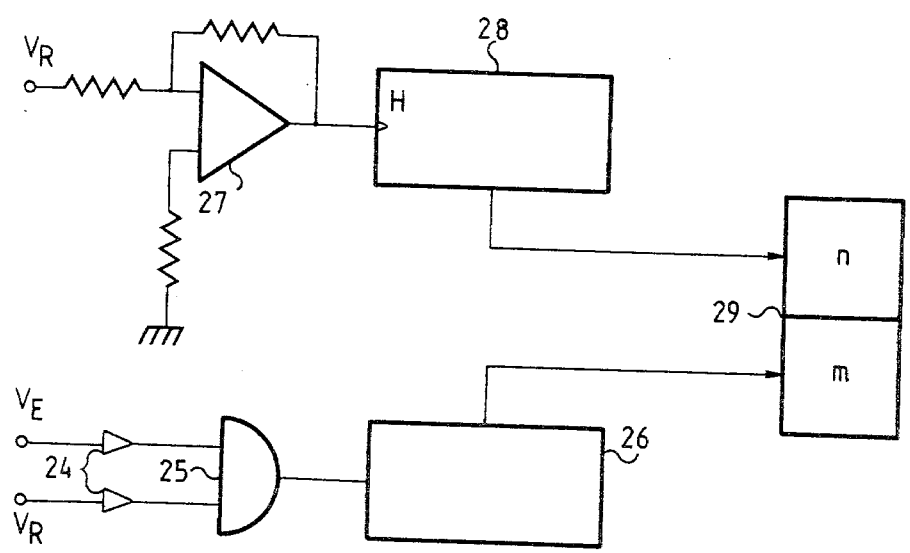
FIG. 5 is a more detailed diagram of an embodiment of the system of FIG. 4.

A preferred embodiment of such a location detection system is shown in FIG. 5. The phase displacement measuring device 21 is formed by standard shaping amplifiers 24 having pulse outputs that drive AND gate 25 having a pulse output which is supplied to counter 26. The position counting device 22 is formed by standard shaping amplifier 27 having a pulse output which is coupled to a clock input, H, of counter 28. The outputs of the counters 26 and 28 are respectively connected to fine and coarse segments m and n of register 29, which serves as a digital display.

The operation of the system for detecting the print head location is now described. Each time the phase difference between the transmitted wave $V_E$ and the received wave $V_R$ is zero, pulses are simultaneously derived from amplifiers 21, causing a pulse to be derived from gate 25. To this end, each of shaper amplifiers 24 produces a relatively short duration pulse in response to each positive going zero crossing of the sinusoidal wave applied to the output thereof; there are two simultaneous positive zero crossings each time carriage 2 is translated a distance equal to the separation between adjacent dot columns on the sheet so each pulse from gate 25 indicates that carriage 2 has traversed a dot column. Furthermore, the position counting system 22 detects each positive going zero crossing of the received signal shaped by the amplifier 27. System 21 supplies the signal derived by it to counter 26 which adds up the number of elementary resolution dots necessary to define a character corresponding to $\lambda$ and supplies the fine bits, i.e., least significant bits, to the register 29. The output of amplifier 27 is connected to a clock input of counter 28, which stores a count indicative of the number of character spaces which carriage 2 is removed from receiver 20. Counter 28 is preferably a ring counter which is returned to zero each time carriage 2 carrying transmitter 19 returns to the start position at the left of the printer against receiver 20. Counter 28 accumulates the number of periods traversed by the print head and supplies a signal representing the number as a coarse signal having bits with greater significance than those of counter 26 to register 29. Thus, for example, for a character including n dot columns and a head position that is coded to a resolution of 14 bits, counter 26 has a maximum count to n bits of $2^m = n$, while counter 28 has a maximum count of n bits.

According to one embodiment, the phase difference is measured numerically and coded with a 6 bit resolution. The positive zero crossing of the phase difference can be counted with a position coding of 14 bits and visually displayed as 4 hexadecimal digits.

While FIG. 5 is a preferred embodiment, it is to be understood that any other types of circuits, as well as any unusual appropriate device, can be used for the counters.

According to an aspect of the invention, the operating frequency of transmitter 19 is servo-controlled because the propagation speed (v) of an ultrasonic, acoustic wave varies as a function of air temperature, pressure and humidity, all of which are related to wavelength. Therefore, the position measurement is a function of these parameters, which effect the measurement of a phase lag. In effect, when the medium propagating an acoustic wave increases in temperature, the wavelength increases. If there is no compensation, the arrival time of the acoustic wave at receiver 20 provides a false position indication. For example, at 136 kHz, if v=340 m/s (approximately the speed of an acoustic wave in air at 20 degrees C.), the acoustic wavelength is 2.5 mm which corresponds to the length of a printed character. In such a situation, a line having a length of 33 cms can accomodate 132 characters, the position of which is accurately represented by the phase of the wave transduced by receiver 20. If the temperature increases and reaches 40 degrees C., whereby v=347 m/s, the wavelength for an acoustic wave of 136 kHz is v/f=(347/136), i.e., around 2.55 mm. In the latter situation, only 129 characters can be counted in a line of 33 centimeters, so there is a substantial error equivalent to a loss of 3 characters. One can therefore understand the importance of servo-controlling the frequency to keep the transmitted wavelength constant.

Figure 6:
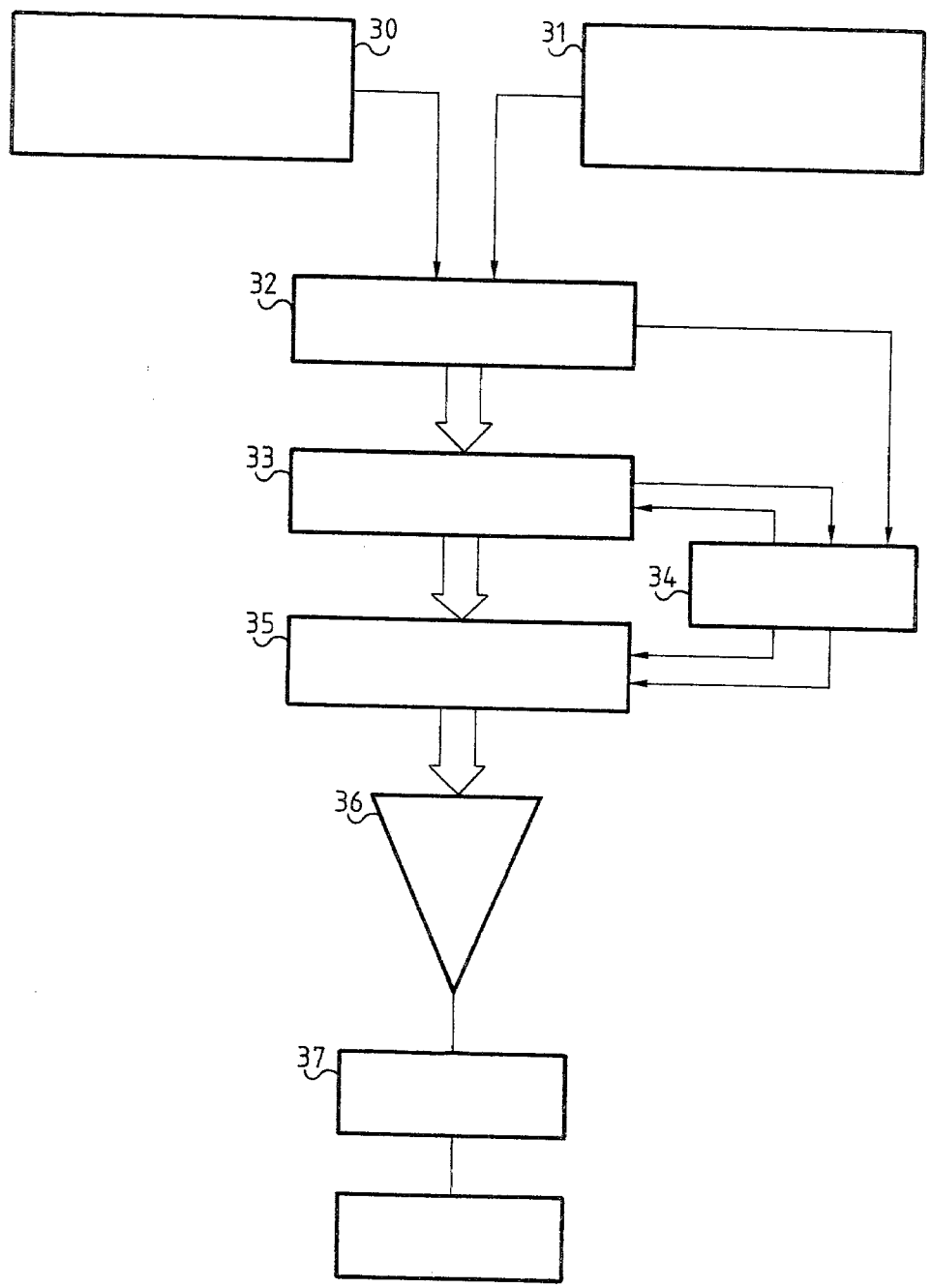
FIG. 6 is a block diagram of a frequency servo-control system used in the system according to the invention.

In the example, the propagation speed, v, of the acoustic wave can reach 347 m/s due to increases in temperature. To keep the wavelength constant it is necessary to increase the frequency of an excitation frequency of transmitter 19. If this frequency is f=v/$\lambda$=347/2.510−3=138.8 kHz, there is a variation in frequency of 2.06%. To correct the frequency, a system as illustrated in FIG. 6 is used. Basically a zero position is situated at the starting point of carriage 2, to the left of the carriage track. When carriage 2 arrives at the end of a line, after 33 cm of travel, the position displayed should be 132 characters, i.e., 1,056 dots and 8,448 definition dots, represented as 10000100000000 in binary code and 2100 in hexadecimal.

When the propagation speed varies, the end of line position is different from 2100. Once this difference is measured and transformed into a voltage, it directly corrects the frequency of voltage controlled oscillator 38.

In the preferred embodiment shown in FIG. 6, in order to effect the difference between the indicated position at the end of the line and the hexidecimal number 2100, the indicated position from counters 26 and 28 is stored in memory 30 at the moment when an end of line contact in the form of a microswitch (not shown) is triggered. The constant hexidecimal value of 2100 is subtracted from the stored indicated position in memory 30 by complementing the value of 2100 in complementer 31 and supplying the memory and complementer contents to adder 32. The difference signal derived from adder 32 is applied to counter 33, the contents of which are immediately transferred as a positive or negative value, according to polarity, by a transfer system 34 into a second counter 35. Counter 35 accumulates this difference with a value previously accumulated therein to enable the wavelength to be maintained constant despite successive modifications of the acoustic propagation medium velocity. The contents of counter 35 are converted by a digital to analogue converter 36 into a variable amplitude voltage, the level of which is divided by a fixed amount by potentiometer 37. The ratio voltage derived from potentiometer divider 37 is added to a fixed voltage which corresponds to the non-corrected frequency; the combined voltage controls the frequency of VCO oscillator 38.

The printer according to the invention also includes a system for servo-controlling the print head displacement speed to a constant, predetermined speed as required for proper striking of the sheet by pointed part 13. The speed control system is a digital serve-controller having a reference speed input derived by a control member responsive to a signal indicating whether or not the print head strikes, in which direction the print head moves, or whether it is commanded to stop. The speed measurement involves measuring head displacements over fixed, equal time intervals, established by a time base derived from transmitter 19 of the location detection system. Since the period between cycles of the 137 kHz sine wave derived from transmitter 19 is 7.3 ms, it is necessary to reduce the 137 kHz sine wave frequency before using it to measure the speed. Because the maximum displacement speed of print head 3 in a preferred embodiment is one microsecond, the time taken to go through a point of resolution is of the order of 40 $\mu$s, whereby a measurement made every 7 $\mu$s (the period of transmitter 19) would be largely useless. The transmitter frequency is, therefore, divided by 128 by two counters which reduce the frequency to a value slightly above 1 kHz. Under these conditions, at a head speed of one m/sec, the variation in position between two measurements is 27 points of resolution (1/64th of a character), i.e., a variation of the last five bits of a digital word indicating the position, at a speed of 0.3 m/sec there is a displacement of ten points, coded on three bits of position counter 23.

It would, therefore, appear sufficient to consider only the five least significant bits of position counter 23 to determine and control the speed of head 3. However, the seven least significant bits are used because if the speed is slightly greater than 1 m/s, the head displacement between two measurements could exceed five bits, i.e., 32 points of resolution are required if the head speed reaches 1.2 m/s. As a result, it was decided to respond to the seven least significant bits, which allows measurement of the speed up to 2 m/s, which is quite sufficient.

Figure 7:
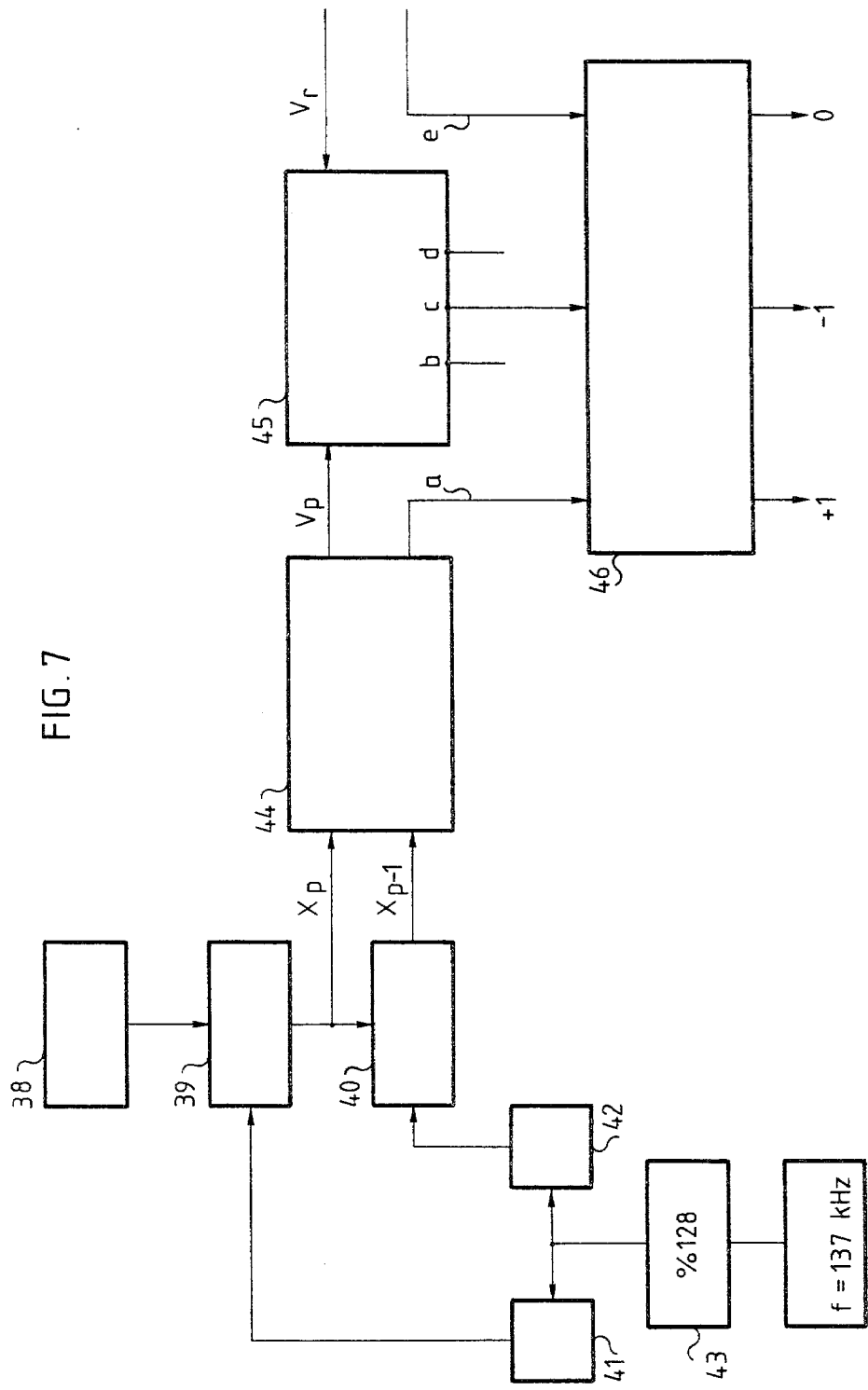
FIG. 7 is a block diagram of a system for servo-controlling the displacement speed of a carriage bearing the print head, according to the invention.
Figures 8, 9:
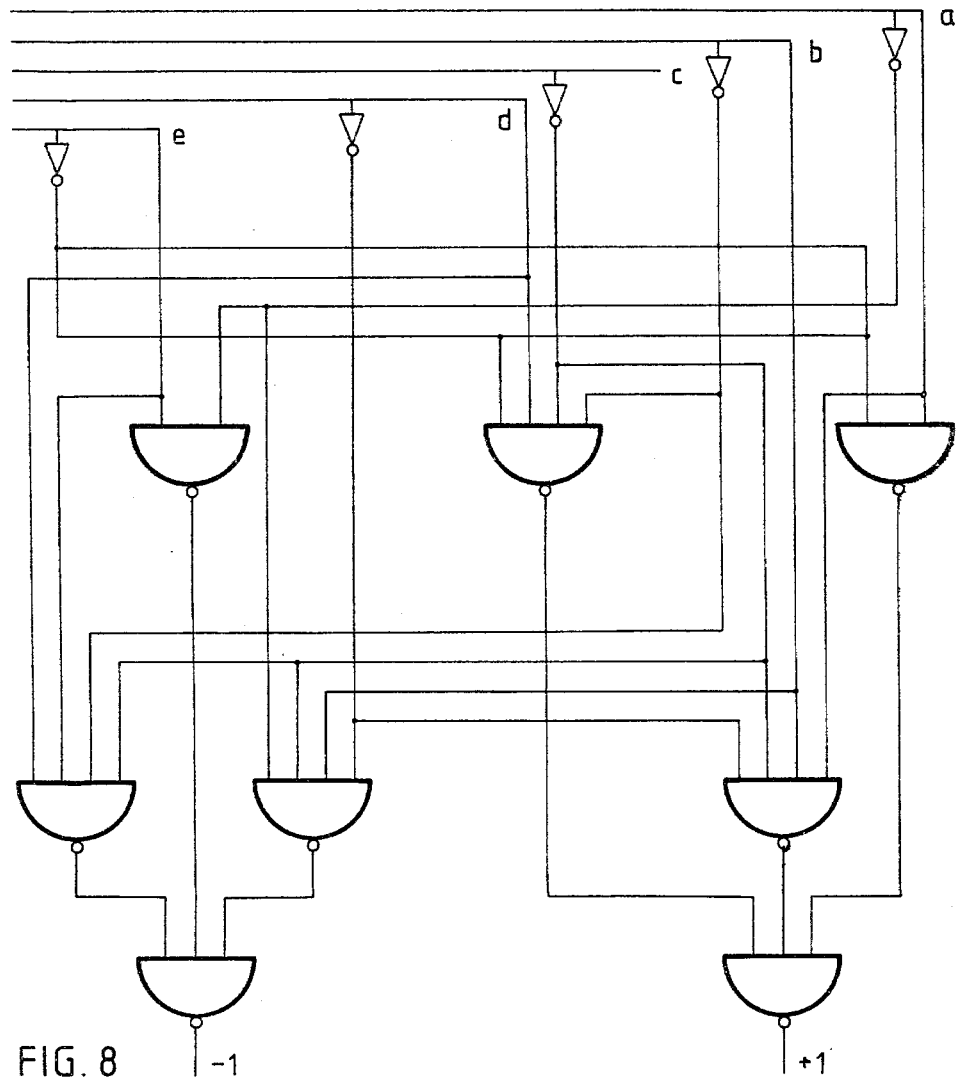
FIG. 8 is a more detailed diagram of a logic network of the FIG. 7 system.
FIG. 9 is the truth table associated with the diagram of FIG. 8.

In FIG. 7, a diagram of a preferred system for servo-controlling the speed of print head 3 is illustrated as including position counter 23. The seven least significant bits of counter 23 are supplied to an output connected to cascaded first and second bistable flip-flop buffers 39 and 40, each of which includes seven stages, one for each of the seven least significant bits of counter 23. Control inputs of flip-flops 39 and 40 are respectively responsive to output signals of NAND gates 41 and 42, in turn responsive to counter 43, forming a divide by 128 frequency divider for the 137 kHz output of transmitter 19. NAND gates 41 and 42 are effectively inverters which derive a pulse type output at a frequency slightly in excess of 1 kHz. Outputs of bistable flip-flops 39 and 40 are connected to a subtracting device 44 having a pulse output which drives one input of serial comparator 45, having a second input responsive to a pulse source having a fixed frequency commensurate with the desired speed of head 3 across the sheet. Comparator 45 derives an output indicative of the frequency difference of the inputs thereof; the output of comparator 45 is coupled to logic network 46, a detailed diagram of which is shown in FIG. 8. Network 46 derives an output signal supplied to standard operational amplifier of a servo-control module for the current supplied to winding 6.

This system operates as follows. At time $t_p$, an indication of the position $x_p$ of print head 3 is derived from the seven stages of bistable flip-flop buffer 39; an indication of the position of $x_{p-1}$ of head 3, i.e., the head position at a previous time $t_{p-1}$, is simultaneously derived from the seven stages of buffer 40. The time $t_p$, when a signal is transferred from counter 23 to buffer 39, corresponds to the trailing edge of the pulse at the output of the NAND gate 41, which edge enables buffer 39 to be loaded. The values of $x_p$ and $x_{p-1}$ derived from buffers 39 and 40 are subtracted in the conventional subtractor 44, formed by two adders and some inverters. The pulse frequency derived from subtractor 44 ($v_p$), representing the actual speed of head 3, is compared in comparator 45 with a reference frequency ($v_r$) fixed by the user, which corresponds to the distance which it is desired for the print head to move between two measuring times $t_p$ and $t_{p-1}$. Logic network 46 responds to the output of comparator 45, a polarity indication for the reference speed and a polarity indication for the head speed, as derived from subtractor 44, to determine if it is necessary to increase or decrease the speed of head 3. When these operations are finished, the position $x_p$ is transferred to the bistable flip-flop buffer 40 and then becomes the preceding position. The transfer time is determined by the NAND gate 42 decoding the phase 1111101 of counter 43 and deriving an enabling signal for an input of buffer 40.

In FIG. 8 is shown, in a more detailed manner, logic network 46 of FIG. 7. Logic network 46 includes an array of NAND gates connected to determine whether the speed of print head 3 is to be increased or decreased. To do this, the following data are available:

(1) input a representing the direction of movement of head 3, as indicated by the polarity of the output of subtractor 44; the one and zero values of a respectively indicate negative and positive measured speed;

(2) input e representing the polarity of the reference speed with the same conventions as for the measured speed; and (3) the outputs b, c and d of comparator 45 indicating the relation between measured speed $v_m$ and reference speed $v_r$; a one value for output bit b of comparator 45 indicates that $v_m$ is greater than $v_r$, a one value for output bit c indicates $v_m$ is equal to small $v_r$ and a one bit value for output bit d indicates $v_m$ is less than $v_r$.

Using these notations, the truth table of the system shown in FIG. 9 is constructed. The functions to be synthesized are:

X1 (increase the current to winding 6) $= +1 = a\bar{e} + b\cdot \bar{c}de + \bar{e}bcd$, X2 (decrease the current to winding 6) $= -1 = \bar{a}c + \bar{a}b\bar{c}d + e\bar{b}cd$, 0 (do not change the current to winding 6) $= \overline{X1 + X2}$.

The construction of the table illustrated in FIG. 9 is simple; in effect, if a and e are the same value, head 3 is moving in the correct direction. It is then sufficient to adjust the measured speed to the reference speed, for example:

a=0, e=0 (displacement in the 0 direction)

b=1, c=0, d=0, $v_m$ greater than $v_0$.

It is therefore necessary to decelerate, a desired value of minus 1. If a and e are not equal, head 3 is moving in the reverse direction to that indicated and it is therefore proper to change the direction of movement; if a=1, e=0, it is necessary to derive the +1 signal to obtain a movement in the positive direction. The reverse is true if a=0, e=1.

The X1 and X2 functions are synthesized using NAND gates in the following manner:

X1=(a/e)/(b/$\bar{c}$/$\bar{d}$/a)/($\bar{e}$/b/$\bar{c}$/d)

X2=($\bar{a}$/e)/(a/b/$\bar{c}$/d)/(e/$\bar{b}$/$\bar{c}$/d).

Figure 10:
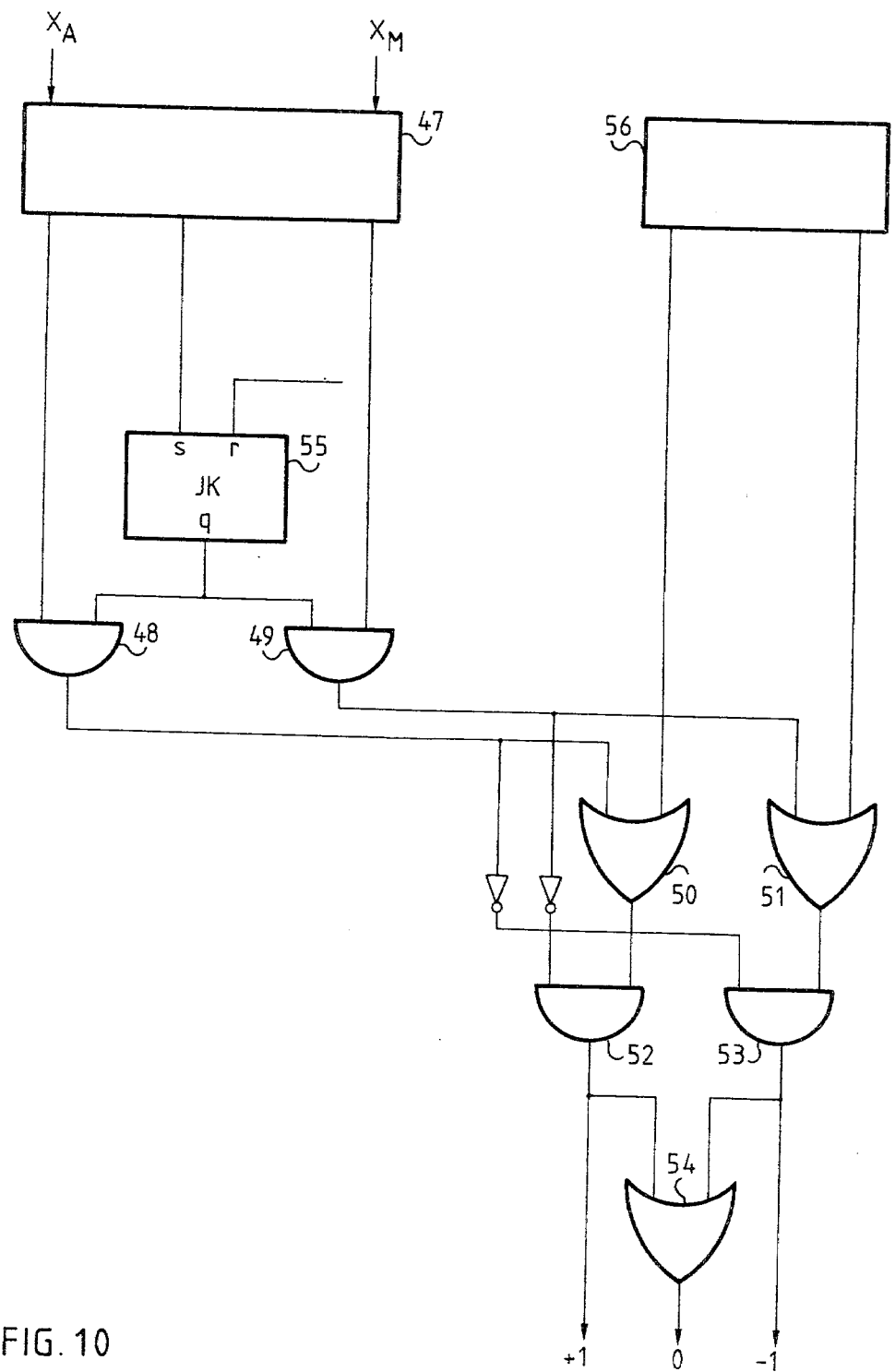
FIG. 10 is a block diagram of the system for servo-controlling the speed and position of the carriage bearing the print head.

In FIG. 10 is shown a block diagram of a preferred embodiment for servo-controlling the speed and position of carriage 2 bearing print head 3. In effect, in the printer, it is desirable to be able to bring the print head 3 to a stop at a precise position after having moved it at a given speed. The system permitting this servo-control is the same as the preceding speed servo-control system, together with a position servo-control. The principle is as follows: with print head 3 being supposedly located at a point M (variable abscissa $x_M$) and moving towards point A at abscissa $x_A$ at speed V, the system servo-controlling the speed which has already been described is permitted to operate on its own as long as the point A has not been passed. When print head 3 reaches point A, a positioning system, described infra with regard to FIG. 10, moves the head to position A in the following manner.

If the difference $x_A - x_M$ is positive, a "forcing to +1" is carried out, that is, the voltage fed to an amplifier which controls the current for winding 6 is established at a voltage +U. If the difference $x_A - x_M$ is negative, a "forcing to −1" is established, whereby the amplitude is supplied with a voltage of −U. Once the objective has been obtained, the forcings are returned to 0.

The system used for this purpose comprises a comparator 47, which compares signals representing $x_M$ and $x_A$ and delivers at its outputs signals corresponding to the states (1) $x_A - x_M$ greater than 0, (2) $x_A - x_M$ less than 0, (3) $x_A = x_M$; one of the three signals is supplied to a network including AND logic gates 48 and 49, OR gates 50 and 51, AND gates 52 and 53, OR gate 54 and several inverters, as well as JK flip-flop 55. The network is also responsive to the +1 and −1 signals from speed control network 58, as illustrated in FIG. 8. The outputs of the FIG. 10 network designated as +1, −1 and 0 control the amplifier (not shown) for the motor servo-control module which derives signals to increase, decrease and maintain constant the current of winding 6.

While there has been described and illustrated one specific embodiment of the invention, it will be clear that variations in the details of the embodiments specifically illustrated and described may be made without departing from the true spirit and scope of the invention as defined in the appended claims.

I claim:

1. A dot type printer comprising a print head, a drive system for translating the head along a rectilinear path, said drive system comprising means for detecting the head location and means for servocontrolling the print head on its path, said head location detecting means including an ultrasonic acoustic transmitter/receiver system, a transmitter of the acoustic system being carried by the print head, the receiver of the acoustic system being fixed to a frame of the printer, the ultrasonic system comprising means for controlling the frequency of a wave derived from the transmitter, said frequency control means including memory means for first and second signals for deriving a difference signal, a digital-/analogue converter responsive to the difference signal for deriving a frequency control signal and a voltage controlled oscillator responsive to the frequency control signal for deriving an excitation wave for the transmitter.

2. The printer of claim 1 wherein the acoustic system includes means for detecting a number of continuous wave periods of an acoustic wave propagating between the transmitter and the receiver.

3. The printer of claim 1 wherein the acoustic system includes means for measuring the phase displacement between an acoustic wave transmitted from the transmitter and received by the receiver and means responsive to the measured phase displacement for deriving a coded signal to define the position of the head with the space required for one character printed by the head.

4. The printer of claim 3 or 1 wherein the means for servo-controlling the print head includes a linear motor for displacing the head along the rectilinear path, means for controlling said motor including means for comparing the head position as measured by the detecting means with a set distance.

5. The printer of claim 1 wherein the means for servo-controlling the print head includes a linear motor for displacing the head along the rectilinear path, means for controlling said motor including means for comparing the head position as measured by the detecting means with a set distance.

6. The printer of claim 3 or 1 wherein the means for servo-controlling the print head includes a linear motor for displacing the head along the rectilinear path, means for controlling said motor including means for comparing the head position as measured by the detecting means with a set distance, said means for servo-controlling the print head further including means for correcting the speed of the motor relative to a desired value, said correcting means including memory means for storing signals reprsenting the distances covered in successive time intervals, and a comparator responsive to the stored signals representing distances and a reference signal.

7. The printer of claim 5 wherein the linear motor includes an armature wound on a carriage, the armature including a coil in a magnetic circuit including a closed yoke and a guide rail for the carriage, a magnet surrounded by said yoke and separated on one pole face from the guide rail by an air gap and fixed, on a second pole face, to an arm of the yoke facing the rail.

8. The printer of claim 1 wherein the acoustic system is carried by the print head, the receiver of the acoustic system being fixed to a frame of the printer.

9. A dot type printer comprising a print head, a drive system for translating the head along a rectilinear path, said drive system comprising means for detecting the head location and means for servocontrolling the print head on its path, said head location detecting means including an ultrasonic acoustic transmitter/receiver system, the acoustic system including means for detecting a number of continuous wave periods of an acoustic wave propagating between the transmitter and the receiver, the ultrasonic system comprising means for controlling the frequency of a wave derived from the transmitter, said frequency control means including memory means for first and second signals for deriving a difference signal, a digital to analogue converter responsive to the difference signal for deriving a frequency control signal, and a voltage controlled oscillator responsive to the frequency control signal for deriving an excitation wave for the transmitter.

* * * * *